April 19, 1932. G. E. BARNHART 1,854,444
AIRPLANE WING CONSTRUCTION
Filed Sept. 3, 1929  2 Sheets-Sheet 1
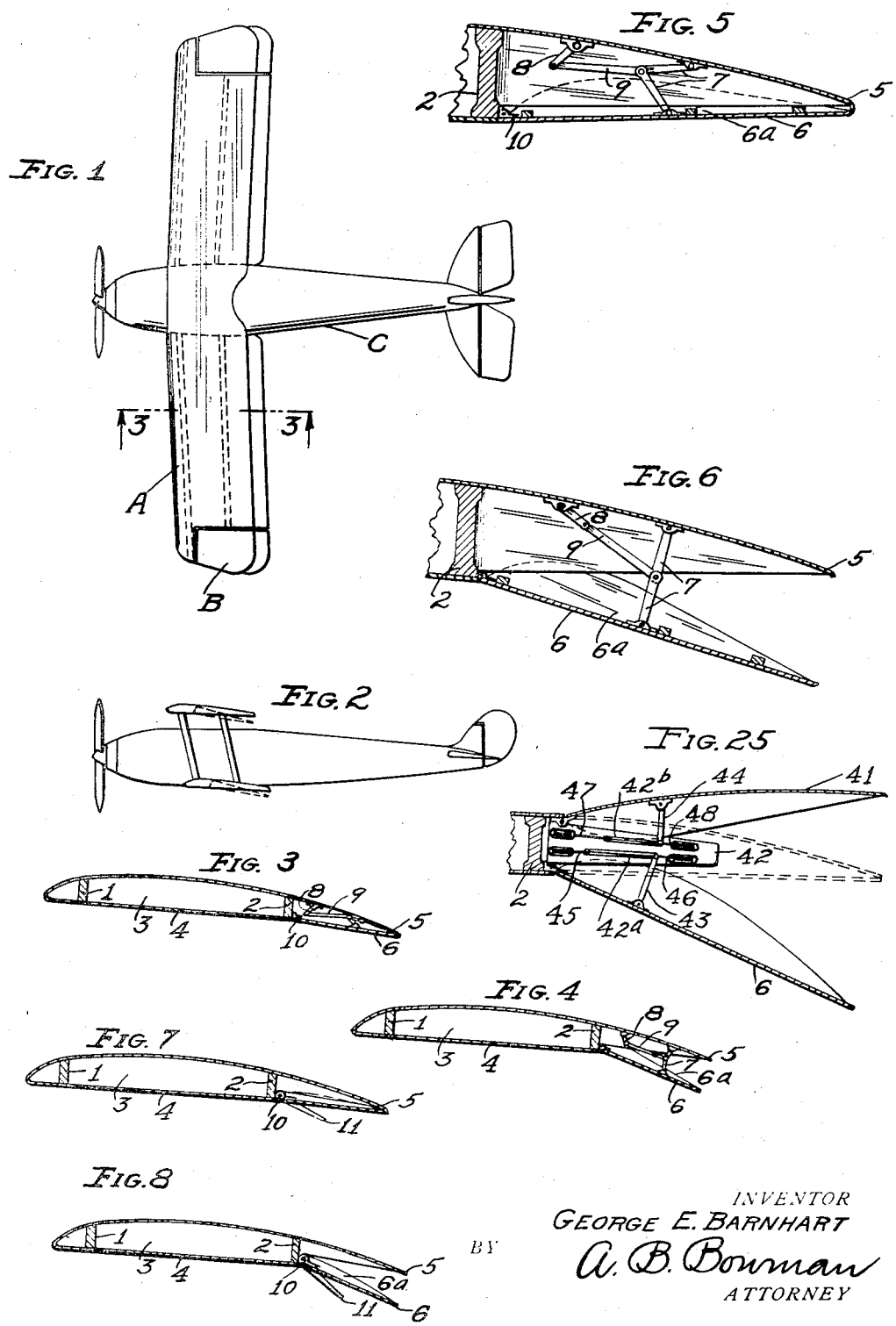
INVENTOR
GEORGE E. BARNHART
BY A. B. Bowman
ATTORNEY

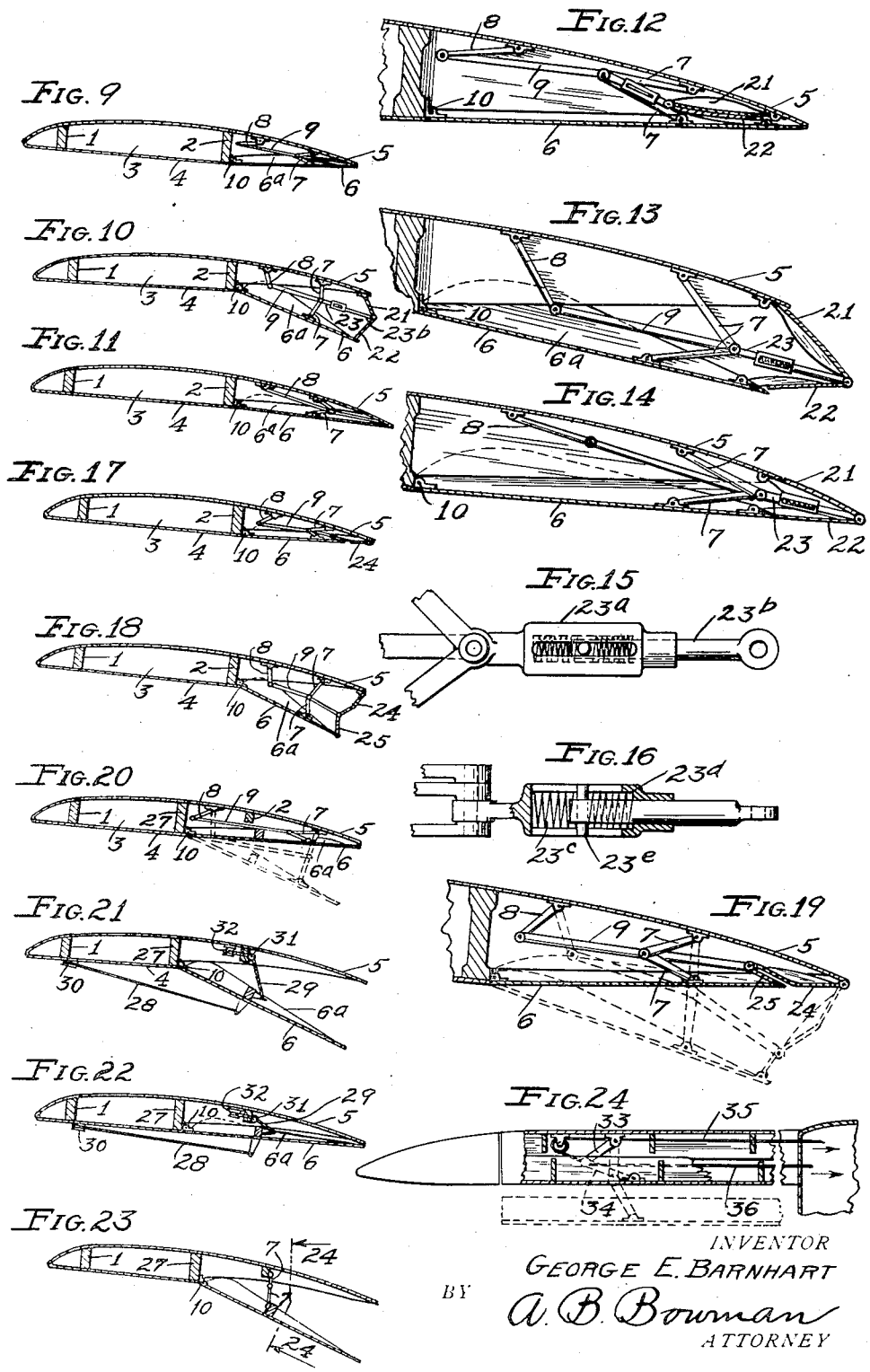

Patented Apr. 19, 1932

1,854,444

UNITED STATES PATENT OFFICE

GEORGE E. BARNHART, PASADENA, CALIFORNIA

AIRPLANE WING CONSTRUCTION

REISSUED

Application filed September 3, 1929. Serial No. 389,932.

My present invention relates to airfoil construction for airplanes, and particularly to wing construction of airplanes.

The objects of this invention are: first, to provide a wing or other airfoil whereby the angle of incidence or angle of attack of the wing or other airfoil may be easily and quickly changed so that, when desired, the lift of the wing of other airfoil may be increased to a maximum substantially instantaneously; second, to provide a wing or other airfoil structure for airplanes whereby the angle of incidence of a portion of the wing or other airfoil may be increased quickly and easily, and to provide such a wing structure in which there is no sacrifice in strength of the wing; third, to provide a wing or other airfoil structure whereby a portion of the wing or airfoil is shifted to a greater angle of incidence thereby increasing the head resistance and also the lift, thus providing means to facilitate the landing of airplanes; fourth, to provide a wing or other airfoil structure in which the trailing edges of angularly separated portions of the wing or other airfoil structure are connected by other airfoils and thereby substantially streamlining the gap or open space between the separated portions, and the trailing edges thereof; fifth, to provide a wing structure in which the chord of the wing may be increased easily by pivoted portions of the wing, which pivoted portions may be folded forwardly between a rigid upper portion and a shiftable lower portion of the wing, and when so folded forwardly the same are concealed and the wing assumes a normally shaped wing of shorter chord; sixth, to provide novel means for shifting the various wing or airfoil surfaces; and, seventh, to provide a novel and simple and economical wing stabilizer, or control or other airfoil surface for airplanes, and one which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of a biplane type of air plane incorporating my invention, certain portions of the airplane not necessary for the purpose of illustrating this invention being omitted; Fig. 2 is a side view thereof showing by dotted lines the shifted positions of the aileron and of portions of the wing; Fig. 3 is an enlarged sectional view through the wing on the line 3—3 of Fig. 1, showing the lower surface at the rear portion of the wing; Fig. 4 is a similar view thereof but showing the pivoted portion shifted downwardly to its extreme position; Figs. 5 and 6 are, respectively, enlarged fragmentary views of the wing shown in Figs. 3 and 4 to facilitate the illustration of the mounting and operation of the pivoted portions of the wing; Figs. 7 and 8 are sectional views similar to Figs. 3 and 4 but showing modified means for shifting the pivoted wing surface; Fig. 9 is a sectional view of a wing structure embodying my invention in a slightly modified form; Fig. 10 is a sectional view thereof showing the pivoted wing section shifted downwardly and airfoil sections pivoted to the trailing edges of the rigid and shiftable portion; Fig. 11 is another view thereof showing the pivoted airfoil sections shifted backwardly for increasing the chord of the wing; Figs. 12, 13 and 14 are, respectively, enlarged sectional views of the rear portions of the wings shown in Figs. 9, 10 and 11; Fig. 15 is an enlarged fragmentary view of yieldable link means for shifting the above mentioned airfoil section; Fig. 16 is a side view of the link means partly in section; Figs. 17 and 18 are other sectional views of wings showing other slightly modified forms of construction and showing the closed and open positions for the folded and unfolded positions; Fig. 19 is an enlarged fragmentary sectional view of the rear portion of the wing in the position shown in Fig. 18; Fig. 20 is a sectional view of a wing showing another slightly modified form of construction; Fig. 21 is a sectional view of a structure similar to that shown in Fig. 20, but embodying a different means of operation, the pivoted portion of the wing being shown in a downward position; Fig. 22 is a sectional view of the structure shown in Fig. 21, but showing the pivoted portion in its normal upper position; Fig. 23 is a sectional view of a wing similar to that shown in Figs. 20 and 21, but showing a slightly modified means for shifting the same; Fig. 24 is an enlarged fragmentary view of the wing structure shown in Fig. 23, but on a longitudinal line with respect to the wing and also showing the pivoted portion in its upwardly shifted position; and Fig. 25 is a fragmentary sectional view of another modification of my invention.

Like characters of reference refer to similar parts and portions throughout the several views of the drawings.

In Fig. 1 of the drawings the pivoted portions of the wings, designated A, are positioned intermediate the ends of the wings and extend between the ailerons B and the fuselage C, the ailerons in this instance being at the extreme ends of the wings and backwardly from the front spars of the wings. It is to be understood, however, that the specific location of the pivoted portions of the wings may be varied as desired and is not confined to the specific location illustrated.

In the structures illustrated in Figs. 3 to 19, inclusive, the wing is formed or reinforced by the usual spars 1 and 2 extending longitudinally of the wing near the entering edge and about midway between the spar 1 and the trailing edge, or somewhat closer to the trailing edge than to the former. These spars are reinforced and the shape of the wing and camber formed by the ribs 3. These ribs may be covered by any suitable fabric or other covering 4 which extends from the lower side of the rear spar 2, around the under side of the wing, around the entering edge and over the upper surface of the wing to the trailing edge 5 of the upper surface. The opening between the rear spar 2 and the trailing edge 5 of the upper surface of the wing is normally enclosed by a shiftable wing surface or section 6 which is constructed similar to other airfoils except that it is enclosed at one side only, the other or inner side, designated 6a, having the reinforcing ribs and other members. This shiftable wing section 6 is hinged at its forward edge preferably to the spar 2 or any other suitable portion of the rigid portion of the wing, as the upper portion may be called.

As shown best in Figs. 5 and 6, the lower or pivoted wing section 6 may be shifted relative to the rigid upper portion by toggle joint members 7 pivotally connected together and to the rigid wing section and the shiftable wing section. These toggle joint members 7 may be contracted, as shown in Fig. 5, by a crank arm 8 pivotally connected to the toggle joint members by a link 9, the crank member 8 being mounted on the rigid wing section and extending toward and preferably into the fuselage so that the same may be operated readily.

When the lower wing section is shifted to its upper or folded position, as shown in Fig. 5, the wing functions the same as in the ordinary wing; but when the same is shifted downwardly to the position shown in Fig. 6, the angle of incidence is increased materially increasing the lift of the wing and also increasing the head resistance, therefore, facilitating the landing of airplanes. The take-off distance on the ground is also decreased by the increased angle of incidence.

The rigid and shiftable wing or airfoil sections, shown in Figs. 7 and 8, are similar to those previously described, but the shiftable wing sections are shifted downwardly by torque rods 10 at the pivotal axis of the pivoted wing section. This torque rod extends through the wing and preferably into the fuselage where the same may be rotated by a suitable lever 11.

The rigid and shiftable wing sections and the means for operating the same, as shown in Figs. 9 to 14, inclusive, are substantially the same as those described in Figs. 3 to 6. In the structure shown in Figs. 9 to 14, however, I have provided additional surfaces 21 and 22 which are referred to as airfoil sections. These sections are relatively narrow and extend the full length of the shiftable wing section 6. The airfoil section 21 is pivoted at one edge to near the trailing edge of the rigid portion of the wing and assumes substantially the same curvature. The section 22 is pivoted at one edge to near the trailing edge of the shiftable wing section 6. These sections 21 and 22 are pivotally connected at their opposite edges to each other, substantially as shown in Figs. 13 and 14. These airfoil sections 21 and 22 are adapted to enclose the gap or open space between the trailing edges of the rigid portion of the wing and the shiftable portion when the latter is shifted downwardly to a greater angle of incidence. When the ordinary wing chord and section is desired, the sections 21 and 22 are folded inwardly between the rear portion of the rigid wing section and the shiftable portion, as shown best in Fig. 12. Such shifting of the sections 21 and 22 is effected by a link 23 which extends from the pivotal axis between the sections 21 and 22 to the pivotal connection of the toggle members 7. This wing 23 is preferably resilient longitudinally so that the same may yield slightly in either direction, the real value of the link 23 being to shift the sections 21 and 22 beyond dead center or beyond alignment with each other either inwardly between the wing sections or backwardly. A form or yieldable or resilient link is shown in Figs. 15 and 16. This link consists of a pair of slidably connected members 23a and 23b the latter of which is provided with a transverse pin 23e slidable in longitudinal slots in the member 23a, and springs 23c and 23d positioned within the link 23a and in engagement with the opposite side of the pin 23e.

When the sections 21 and 22 are shifted backwardly to the extreme position, as shown in Fig. 14, the same form extensions of the upper or rigid wing section and the shiftable wing section and conform substantially with the curvature of the exterior surfaces thereof, extending the width or chord and therefore the lifting effect of the wing.

The structure, shown in Figs. 17, 18 and 19, is similar to that just described in performing the function of closing the gap or space between the shiftable lower wing section and the rigid upper wing section when the former is shifted downwardly. In the structure shown in Figs. 17, 18 and 19, the section 24, which is pivoted to the rigid portion of the wing, is shaped on an obtuse angle and forms, with the portion pivoted to the rigid wing section, an airfoil surface at the extreme trailing edge of the lower portion of the wing, and a continuation of the lower surface of the shiftable or pivoted wing section 6. To the other edge of the airfoil section 24 is pivoted another airfoil section 25 which is in turn pivoted at its opposite edge to the free edge of the pivoted wing section 6. When these airfoil sections 24 and 25 are shifted outwardly by the link 26 which is connected to the toggle members 7, the airfoil sections 24 and 25 also enclose the space at the trailing edges of the rigid and shiftable wing sections, as shown by dotted lines in Fig. 19.

The structure shown in Figs. 20 to 24, inclusive, are slightly different in that the rear spar 2 is decreased in height and a third spar, designated 27, is positioned between the forward and rear spar. The shiftable wing section 6 in this instance is pivotally connected at its forward edge to the lower portion of the intermediate spar 27, so that a wider shiftable section 6 may be used. In Fig. 20 the operation or shifting of the shiftable wing section 6 is effected by toggle means, as described above. In Figs. 21 and 22 the section 6 is shifted by cables 28 and 29 extending, respectively, around sheaves 30 and 31 mounted on the under side of the rigid wing section, and at the inner side thereof on or adjacent the rear spar 2. From the sheave 31 the cable extends preferably around another sheave 32 and then toward the fuselage of the airplane.

In Figs. 23 and 24 the toggle means, consisting of links 33 and 34, is at a right angle to that previously described and is actuated by cables 35 and 36, as shown best in Fig. 24. It will be noted that instead of employing ailerons B, as shown in Figs. 1 and 2, the pivoted airfoil surfaces 6 at the under sides of the wings may serve as ailerons when separately operated which may be effected by the usual control stick.

Fig. 25 shows the structure similar to that shown in Figs. 3 to 6 in which the rear portion of the lower surface of the wing may be tilted downwardly at an angle, but also shows the rear portion of the upper surface of the wing pivoted at its forward edge and adapted to be tilted upwardly. Both of these airfoil surfaces designated respectively 6 and 41 may be variously shifted to their tilted positions by any suitable means. In the illustrations the airfoil surfaces are pivoted at their forward edges to the rear side of the rear spar. To this spar are also secured the frames or brackets 42 which extend backwardly. These brackets are provided with longitudinal guide portions 42a and 42b in which are reciprocally mounted respectively one end of links 43 and 44 which links are pivotally connected at their opposite end to the inner side of the shiftable airfoil surfaces 6 and 41. As the ends of the links 43 and 44 are drawn inwardly along the guide portions, the airfoil surfaces collapse inwardly assuming the positions shown by dotted lines in Fig. 25 forming the normal contour of the wing. The reciprocally mounted ends of the links may be shifted inwardly and outwardly by cables 45 and 46 connected to the link 43, and cables 47 and 48 connected to the link 44. These cables extend around sheaves mounted on the bracket 42. From these sheaves the cables extend through the wing to the fuselage from which they may be controlled as desired. It will be here noted that the airfoil surfaces 6 and 41 may be separately controlled so that only the airfoil surfaces 6 may be shifted downwardly when taking off, or both may be shifted outwardly when landing, the outwardly shifting of both surfaces increasing not only the lift but markedly increasing the head resistance.

Though I have shown and described a particular construction, combination and arrangement of parts and portions, and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In an airfoil of the class described, a rigid forward and upper portion, a shiftable surface pivoted at its forward edge at the lower and rear portion of the rigid forward and upper portion, the trailing edges of both being adapted to be separated when said shiftable surface is lowered about its pivotal axis, and narrow airfoil surfaces, each pivoted at one edge to one edge of each of the former and also pivoted together at their opposite edges, said narrow airfoil surfaces enclosing the space between the trailing edges of the rigid upper and forward portion and of the shiftable surface, and also forming a substantial streamline effect for the airfoil when the shiftable surface is lowered, the narrow airfoil surfaces being adapted to be folded backwardly for increasing chord of the airfoil.

2. In an airfoil of the class described, a rigid forward and upper portion, a shiftable surface pivoted at its forward edge at the lower and rear portions of the rigid forward and upper portion, the trailing edges of both being adapted to be separated when said shiftable surface is lowered about its pivotal axis, and narrow airfoil surfaces, each pivoted at one edge to one edge of each of the former and also pivoted together at their opposite edges, said narrow airfoil surfaces enclosing the space between the trailing edges of the rigid upper and forward portion of the shiftable surface, and also forming a substantial streamline effect for the airfoil when the shiftable surface is lowered, the narrow airfoil surfaces being adapted to be folded backwardly for increasing the chord of the airfoil, said narrow airfoil surfaces when folded backwardly forming substantial continuations of the upper surface and lower surface of the airfoil.

3. In an airfoil structure, a rigid upper portion, a shiftable lower portion pivoted at its forward edge to the under side of the rigid upper portion and adapted to be shifted to a greater angle of incidence and separated from the upper portion, and narrow airfoil surfaces hinged to the trailing edges of each of the rigid upper portion and the shiftable lower portion, the narrow airfoil surfaces being also hinged together at their free edges and to be shifted backwardly from such trailing edges forming substantial streamlined effect for the rigid upper portion and shiftable lower portion when the same are separated at their trailing edges.

4. In an airfoil structure, a rigid upper portion, a shiftable lower portion pivoted at its forward edge to the under side of the rigid upper portion and adapted to be shifted to a greater angle of incidence and separated from the upper portion, and narrow airfoil surfaces hinged to the trailing edges of each of the rigid upper portion and the shiftable lower portion, the narrow airfoil surfaces being also hinged together at their free edges and to be shifted backwardly from such trailing edges forming substantial streamlined effect for the rigid upper portion and shiftable lower portion when the same are separated at their trailing edges, said narrow airfoil surfaces being foldable between the rigid upper portion and the shiftable lower portion when the shiftable lower portion is in its normal position of flight with respect to the rigid upper portion.

5. In an airfoil structure, a rigid upper portion, a shiftable lower portion pivoted at its forward edge to the under side of the rigid upper portion and adapted to be shifted to a greater angle of incidence and separated from the upper portion, and narrow airfoil surfaces hinged to the trailing edges of each of the rigid upper portion and the shiftable lower portion, the narrow airfoil surfaces being also hinged together at their free edges and to be shifted backwardly from such trailing edges forming substantial streamlined effect for the rigid upper portion and shiftable lower portion when the same are separated at their trailing edges, said narrow airfoil surfaces being foldable between the rigid upper portion and the shiftable lower portion when the shiftable lower portion is in its normal position of flight with respect to the rigid upper portion, said narrow airfoil surfaces being also foldable outwardly for increasing the chord of the airfoil, said narrow airfoil surfaces forming substantial continuations of the exposed surfaces of the rigid upper portion and the shiftable lower portion.

6. In an airplane wing structure, a framework, a permanent covering over the upper side and the forward portion of the lower side, a shiftable wing surface hinged at its forward edge at the lower portion of the framework and at the rear edge of the covering for the forward portion of the lower side of the framework, means for raising and lowering the pivoted wing surface for varying the angle of incidence of the rear portion of the wing structure, and narrow airfoil surfaces, each hinged at one edge to the trailing edges of each of the framework and the lower wing surface, said narrow airfoil surfaces being hinged together at their opposite edges, said narrow airfoil surfaces being adapted to enclose the space between the framework and the pivoted wing surface when the latter is lowered about its pivotal axis, the narrow airfoil surfaces being adapted to be folded between the framework and the pivoted wing surface when the latter is shifted to its normal upper position, and also adapted to be folded backwardly for increasing the chord of the wing.

7. In a means of the class described, an airplane wing member having a cut-out portion, at its end and extending from immediately behind its entering edge to its trailing edge, an aileron pivotally mounted at its forward edge immediately behind said entering edge and extending in said cut-out portion to the trailing edge of the wing member, and an airfoil surface pivotally mounted at its forward edge at the lower side and intermediate the entering and trailing edges of the wing member and inwardly from the aileron, said airfoil surface being adapted to conform to the surface of the underside of the wing member and adapted also to be shifted at an angle thereto from the pivotal axis of the airfoil surface.

In testimony whereof, I have hereunto set my hand at Pasadena, California, this 22 day of August, 1929.

GEORGE E. BARNHART.